(12) United States Patent
Cox

(10) Patent No.: US 7,591,126 B2
(45) Date of Patent: Sep. 22, 2009

(54) APPARATUS FOR TWO-MOTION CABLE ENGAGEMENT

(75) Inventor: Marvin Cox, Wichita, KS (US)

(73) Assignee: Wescon Products Company, Wichita, KS (US)

( * ) Notice: Subject to any disclaimer, the term of this patent is extended or adjusted under 35 U.S.C. 154(b) by 180 days.

(21) Appl. No.: 11/455,616

(22) Filed: Jun. 19, 2006

(65) Prior Publication Data

US 2007/0289277 A1  Dec. 20, 2007

(51) Int. Cl.
*A01D 69/00* (2006.01)
(52) U.S. Cl. .......................... 56/10.8; 56/11.3
(58) Field of Classification Search .............. 56/10.2 R, 56/10.5, 10.8, 11.3, 11.7, 11.8, 16.7, DIG. 6, 56/DIG. 15, DIG. 18; 74/500.5, 501.5 R, 74/501.6, 502.2, 483 R
See application file for complete search history.

(56) References Cited

U.S. PATENT DOCUMENTS

| | | | |
|---|---|---|---|
| 4,309,862 A * | 1/1982 | Carlson | 56/10.5 |
| 4,363,206 A | 12/1982 | Schmitt | |
| 4,413,466 A | 11/1983 | Beugelsdyk et al. | |
| 4,428,180 A | 1/1984 | Carlson | |
| 4,432,191 A | 2/1984 | Schmitt | |
| 4,466,232 A | 8/1984 | Beugelsdyk et al. | |
| 4,466,308 A | 8/1984 | Kester et al. | |
| 4,503,958 A * | 3/1985 | Nishio | 192/12 R |
| 4,580,455 A | 4/1986 | Beugelsdyk et al. | |
| 4,599,912 A | 7/1986 | Barnard et al. | |
| 4,667,459 A * | 5/1987 | Scanland et al. | 56/11.3 |
| 4,756,032 A * | 7/1988 | Wang | 5/506 |
| 4,805,386 A | 2/1989 | Urban | |
| 4,813,214 A | 3/1989 | Barnard et al. | |
| 4,850,182 A | 7/1989 | Barnard et al. | |
| 4,930,369 A | 6/1990 | Barnard et al. | |

(Continued)

OTHER PUBLICATIONS

Wescon Products Company "Light Duty Mechanical Control System" Catalog 2002, cover and inside front cover, and pp. 10-25.

(Continued)

*Primary Examiner*—Thomas B Will
*Assistant Examiner*—Mai T Nguyen
(74) *Attorney, Agent, or Firm*—Hovey Williams LLP

(57) ABSTRACT

A method and apparatus for two motion cable engagement includes a housing adapted for attachment to a tubular member such as a handlebar or the like of a walk-behind lawn-mower, a lever assembly pivotably mounted to the housing, and a socket operatively connectable to the lever assembly and actuatable by a deadman handle. The lever assembly preferably includes a lever, a hub connected to the lever, and a pivotable member which is selectively pivotably driven by the hub. When the socket is pivoted by the deadman handle from a primary position to an engaged position, movement of the lever from an initial position to an advanced position produces pivoting of the pivotable member and a control cable attached thereto. With the socket remaining in the engaged position, the lever may be permitted to return to the initial position, and the pivotable member remains advanced and held by the socket, keeping the control cable in the actuated condition until the deadman handle is released, whereupon tension on the control cable causes the pivotal member returned to its initial position and permits the control cable to extend and deactivate a controllable mechanism to which it is attached.

19 Claims, 9 Drawing Sheets

U.S. PATENT DOCUMENTS

| | | | |
|---|---|---|---|
| 4,936,160 A | | 6/1990 | Barnard et al. |
| 5,000,059 A | | 3/1991 | Barnard |
| 5,321,994 A | | 6/1994 | Barnard |
| 5,355,662 A | * | 10/1994 | Schmidt ................. 56/11.3 |
| 5,467,583 A | | 11/1995 | Beugelsdyk et al. |
| 5,497,676 A | | 3/1996 | Barnard |
| 5,509,258 A | * | 4/1996 | Thier et al. ................. 56/11.3 |
| 5,520,070 A | | 5/1996 | Beugelsdyk et al. |
| 5,596,909 A | | 1/1997 | Cox et al. |
| 5,657,669 A | | 8/1997 | Barnard |
| 5,680,748 A | | 10/1997 | Barnard |
| 5,685,271 A | * | 11/1997 | Taomo et al. ............... 123/398 |
| 5,701,967 A | | 12/1997 | Barnard |
| 5,813,284 A | | 9/1998 | Cox |
| 5,906,139 A | | 5/1999 | Beugelsdyk et al. |
| 6,023,993 A | | 2/2000 | Beugelsdyk et al. |
| 6,047,614 A | | 4/2000 | Beugelsdyk et al. |
| 6,070,487 A | | 6/2000 | Beugelsdyk et al. |
| 6,354,170 B1 | | 3/2002 | Beugelsdyk et al. |
| 2006/0053763 A1 | * | 3/2006 | Stover et al. ................. 56/16.7 |

OTHER PUBLICATIONS

Wescon Products Company Catalog 1998, cover and inside front cover, and selected pages (17 pages).

Declaration of Anthony Beugelsdyk, Vice-President for Engineering of Wescon Products Company, executed Apr. 13, 2009.

* cited by examiner

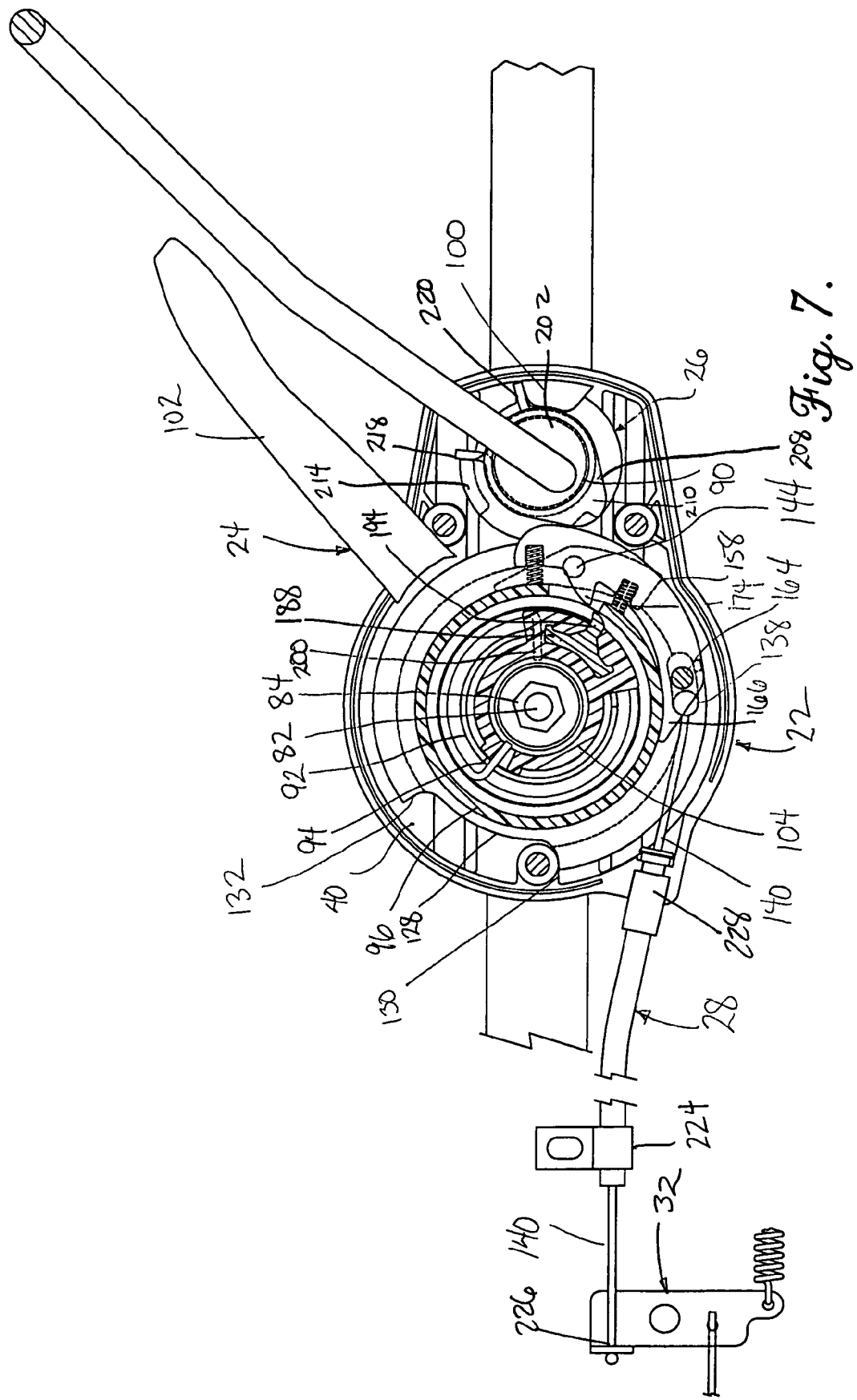

APPARATUS FOR TWO-MOTION CABLE ENGAGEMENT

BACKGROUND OF THE INVENTION

1. Field of the Invention

The present invention broadly concerns a control apparatus for operating a control cable which includes two-motion actuation.

2. Description of the Prior Art

Cable controls are commonly used for a variety of applications to actuate a remote mechanism connected to a control cable. Such applications include, but are not limited to, walk-behind lawn mowers. In many applications such as walk-behind lawn mowers, a graspable bar or handle which serves as a "deadman" control or switch is used in combination with the cable control for safety considerations and may be required by governmental regulations. In these circumstances, in order to successfully operate one or more controllable mechanisms such as a blade brake, blade clutch, or possibly other operable mechanisms such as a ground drive or throttle, the operator may be required to grasp the deadman and hold it in a particular position.

One example of a cable control used for walk-behind lawn mowers is shown in U.S. Pat. No. 4,930,369, the disclosure of which is incorporated herein by reference. In the invention shown and described therein, when the deadman bar is pulled downwardly, an external latch is activated and the lever of the control may be moved. However, release of the deadman bar caused consequent, and often rapid automatic movement of the lever to which the control cable was attached. The present invention is intended as an advancement upon controls of this type.

SUMMARY OF THE INVENTION

The present invention is designed to provide advantages over existing cable controls by providing two-motion actuation with an external bar or the like and also a lever or the like, while confining the movements to the control mechanisms to be resident within a control housing. While the control is designed to provide a familiar type of operation to the user including a deadman and a lever, the control of the present invention is designed to permit the operating mechanisms to be housed internally within the control housing. Additional advantages of the preferred embodiment of the present invention include the ability to avoid rapid movement of the lever caused by tension on the cable when the deadman is released, and the provision of a perceptible click when the internal mechanisms release the operative connection between the deadman and the lever. Furthermore, the structure and arrangement of the present invention provide a cable control which is less expensive to construct and assemble than those of the prior art.

The preferred device in accordance with the present invention includes a shiftable lever pivotable relative to a housing and a socket for receiving a deadman handle. A housing is provided which receives therein a pivotable member shiftably coupled to the lever. The pivotable member, which is preferably shaped as a spool, includes at least one and preferably a plurality of grooves. The lever is preferably provided with a hub which includes a latching dog having a finger extending radially outward from the outer margin of the hub member. The pivotable member also pivotably mounts a catch and a pawl, each of which are provided with a small spring which provides a radially outward biasing force to respectively urge a respective first part of each the catch and pawl outwardly and second part of each the catch and pawl inwardly. The socket includes an eccentric thereon, whereby grasping of the deadman handle moves the eccentric into engagement with the second part of the catch, with the latching dog positioned to engage an inwardly extending latching dog hook on the pivotably mounted pawl. Then, upon advancing movement of the lever, the projection of the latching dog engages the hook which causes the pivotable member, together with the pawl and catch, to move in a circumferential direction. A control cable is coupled to the pivotable member, and the control cable is pulled into the housing as the lever is advanced. When the pivotable member reaches its forward limit of advance, a corner on the first part of the catch is moved radially outwardly by its spring, and held by a step on the eccentric. Thereafter, the operator may allow the lever to move by a return spring back from its initial position, with the catch held in place by the lip of the eccentric. Both the pivotable hub member and the socket are biased in a circumferential direction by respective return springs, whereby the lever returns to its initial position when an advancing force is removed, and whereby the socket is provided with a bail return spring to move the socket to a disengaging position when the deadman handle is released. When the socket returns to the disengaging position, the catch disengages from the socket and the pivotable member, no longer held by either the eccentric or engagement between the hook and latching dog, automatically returns to the initial position by the tension applied by the mechanism on the control cable, and the control cable then moves back in response to the tension to permit disengagement of the clutch or other controllable member.

The preferred embodiment of the present invention provides an enclosed operating control structure which minimalizes intrusion of debris which could foul or result in wear on the control. Other advantages which may be realized by the preferred embodiment hereof include a design which requires only moderate or minimal force for retaining the deadman handle in the operating position, thereby reducing fatigue, allows a fail-safe design which permits the bail socket to return to a disengaged position even if the socket return spring should break, and operation of the control to release the cable without consequent handle movement, thereby avoiding the possibility that a lever will slam into the user or hang-up on a tree limb, some part of the operator's body, or other obstacle which might prevent disengagement of the blade clutch or actuation of a blade brake. In the present control, the operator need only advance the lever and grasp the deadman to pivot the socket in order to engage the device, with most of the interaction between the level and socket occurring internally within the control. Further, in the operation of the device according to the preferred embodiment, an audible "click" sound may be heard when the hub member and the socket engage and disengage. Beneficially, the control is designed whereby if an operating element fails, such as breakage of a return spring or the like, the control fails safely, whereby tension on the cable applied by the operated mechanism such as a blade clutch causes movement of the cable outwardly to deactivate blade movement of a lawn mower.

These and other advantages of the preferred embodiment will be readily appreciated by those skilled in the art with reference to the drawings and description which follow.

BRIEF DESCRIPTION OF THE DRAWINGS

FIG. 7 is a vertical cross-sectional view from the left side of the apparatus hereof, showing the initial positions of the pawl and catch prior to pivoting of the deadman handle and advancement of the control lever;

DESCRIPTION OF THE PREFERRED EMBODIMENT

Figure 11:
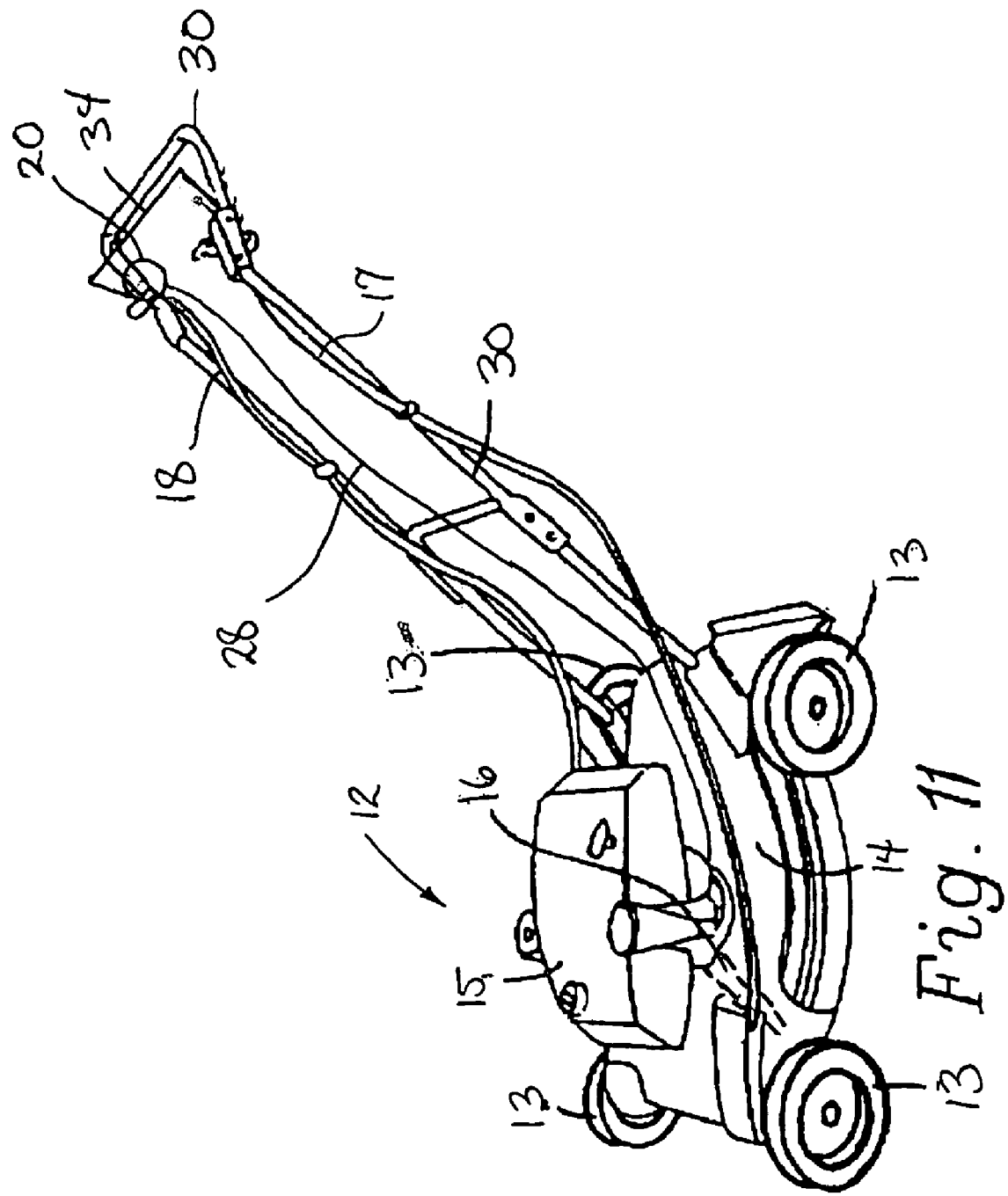
FIG. 11 is a perspective view of a walk-behind lawnmower showing the engine, mower deck, handlebar and deadman assembly in connection with the apparatus hereof.

Referring now to the drawings, FIG. 11 shows a walk-behind lawnmower 12 as one type of equipment with which the present invention is useful. Such a lawnmower 12, as is generally known in the art, includes a plurality of wheels 13, a mower deck 14, an engine 15 mounted on the mower deck, and a blade 16 (shown in broken lines) operatively driven by the engine 15. Also, the lawnmower useful with the invention hereof includes a handlebar 30 and a deadman handle 34 pivotally mounted to the handlebar. For safety reasons, the blade 16 is connected to the engine via a controllable mechanism 32 such as a blade brake or a clutch assembly. In order for the engine 15 to drive the blade 16, the deadman handle much be actuated so that if released, the engine stops turning the blade. All of the foregoing is well known in the art. The lawnmower 12 may include other cables 17 and 18 which may be provided to control respectively a ground drive and a throttle connected to the engine.

An apparatus for two-motion cable engagement 20 in accordance with the present invention broadly includes a housing 22, a lever assembly 24, and a socket assembly 26, and preferably a control cable assembly 28 is connected to the apparatus 20 during manufacture. The apparatus 20 is typically mounted to a tubular structure such as a handlebar 30 of a walk-behind lawnmower. In such applications, the lawnmower includes a remotely controlled mechanism 32 such as a clutch or blade brake as discussed above, which includes as an actuator illustrated by the toggle connection shown in FIG. 7. The lawnmower is further provided with a deadman handle 34 which is connected to the socket assembly 26 so that the deadman handle 34 can be grasped by the user together with the handlebar 30, and when the user releases the deadman handle 34, the mechanism 32 is disengaged as is not only desirable, but may be required by safety regulations.

Figure 4:
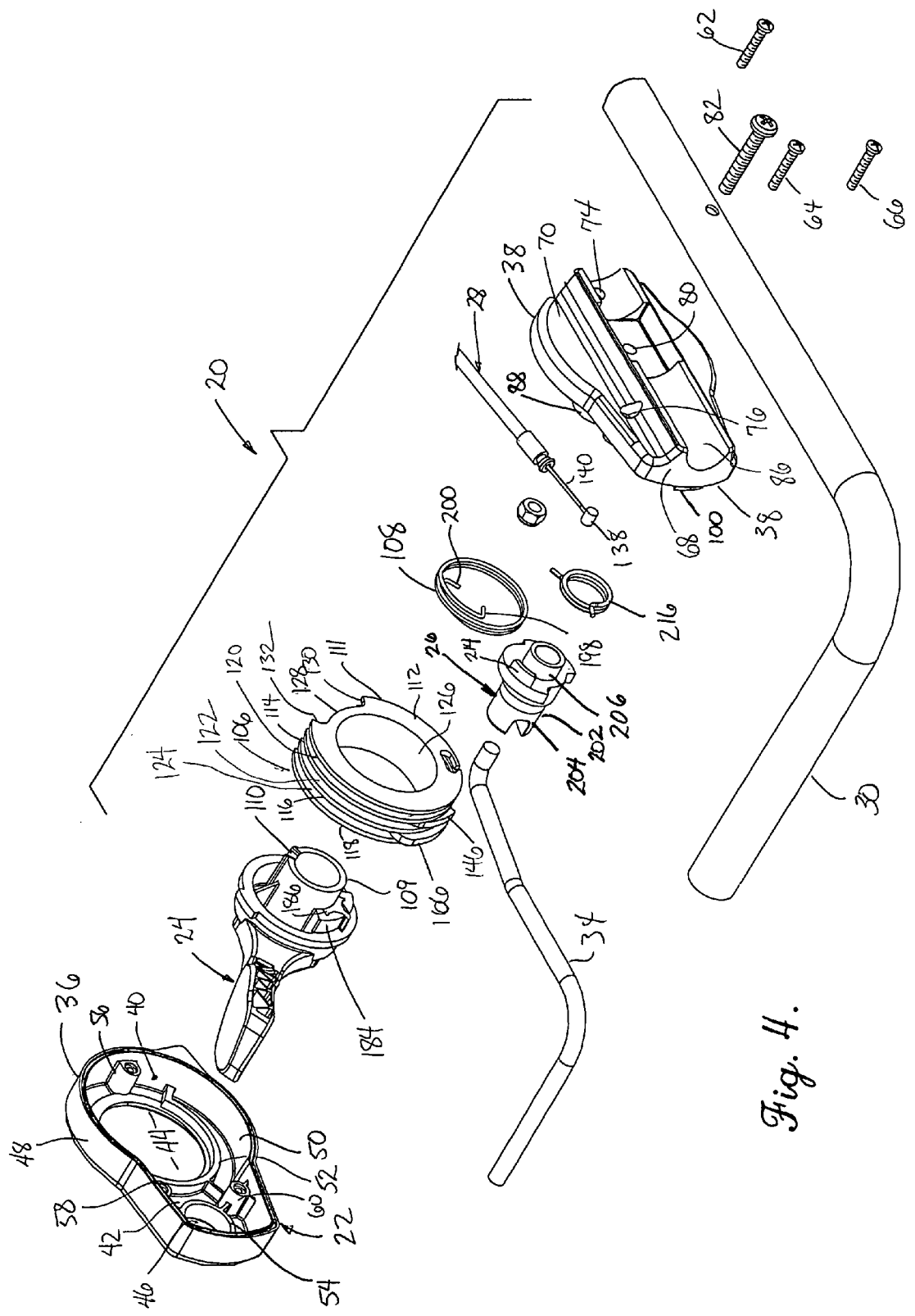
FIG. 4 is a right rear perspective exploded view of the apparatus for two-motion cable engagement with portions of the control cable assembly, handlebar and deadman handle broken away for clarity, and showing return springs for respective attachment to the pivotable member and the socket and showing the interior configuration of one housing half.

In greater detail, the housing 22 is provided as first and second housing halves 36 and 38 which, together with the lever assembly 24 and the socket assembly 26, substantially enclose a chamber 40. The first housing half 36 includes a wall 42 presenting a large circular opening 44 for receiving the lever assembly 24, a small circular opening 46 for receiving the socket assembly 26, an outer surface 48 and an inner surface 50. The inner surface 50 includes a rim 52 which surrounds the large circular opening 44 and a circular bearing edge 54 which surrounds the small circular opening 46. Receivers 56, 58 and 60 are molded into the inner surface 50 and are preferably internally threaded for threadably receiving threaded fasteners 62, 64 and 66 as shown in FIG. 4. The forward receiver 56 also serves as a limiter on the pivotal travel of the lever assembly 24 as will be explained hereinafter.

Figure 5:
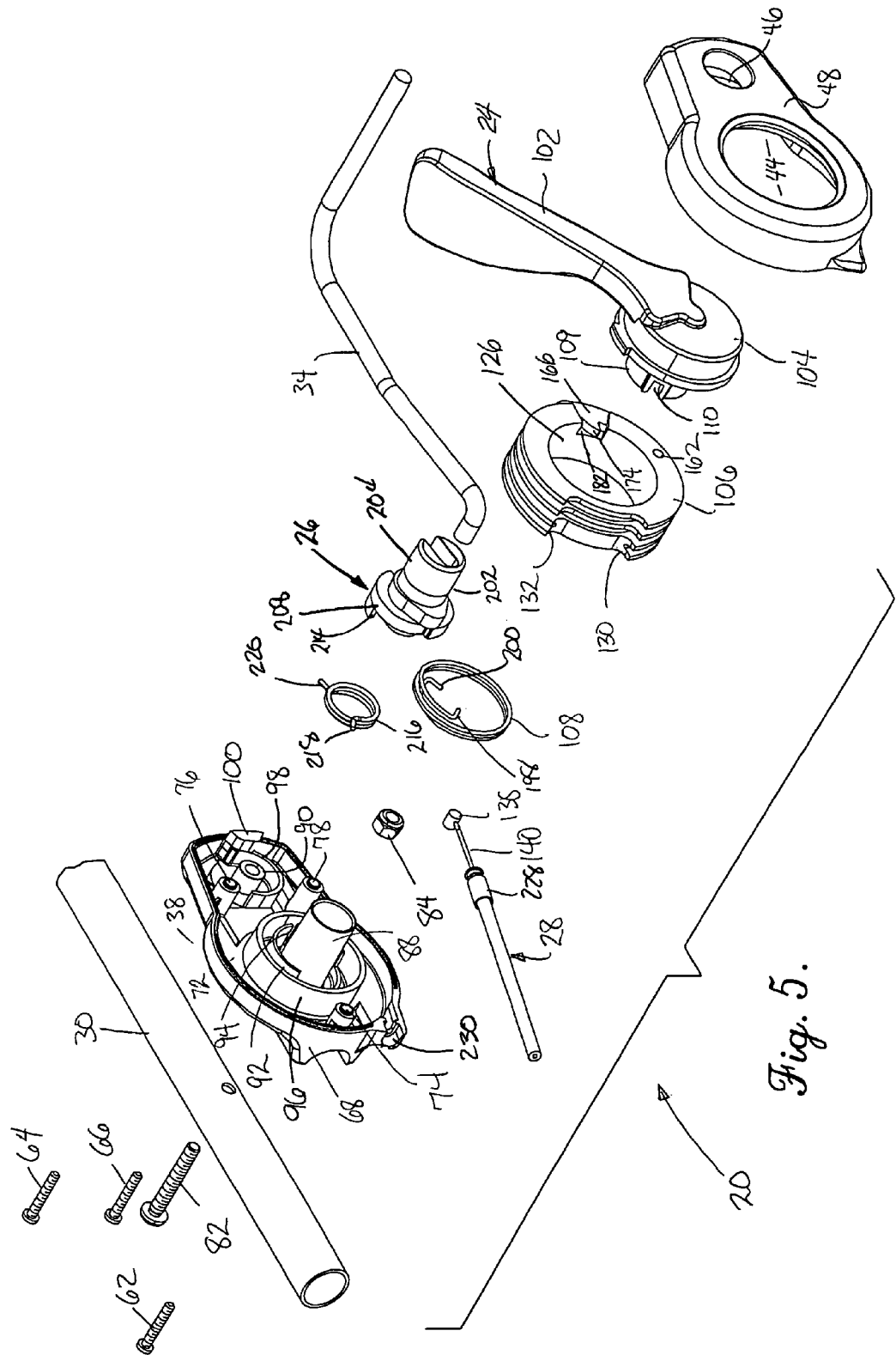
FIG. 5 is a left front perspective exploded view of the apparatus similar to FIG. 4 which shows the interior configuration of another housing half.

The second housing half 38 is configured for mating engagement with the first housing half 36 and includes a wall 68 having an outer surface 70 and an inner surface 72. Holes 74, 76 and 78 are configured opposite receivers 56, 58 and 60 to permit fasteners 62, 64 and 66 to pass therethrough. In addition, the wall 68 preferably has a central hole 80 for receiving a threaded fastener 82 which preferably extends along the pivot axis of the lever assembly 24. The fastener 82 also serves to mount the apparatus 20 to the handlebar 30 by the use of nut 84. The outer surface 70 as shown in FIG. 4 includes a longitudinally extending preferably semicircular channel 86 which corresponds in shape to the handlebar 30. The inner surface 72 is best seen in FIG. 5 and preferably includes lever spindle 88 and a socket spindle 90. An arcuate sector 92 is radially spaced from and partially surrounds the lever spindle 88 and includes a slot 94 shown in FIG. 5 oriented toward the socket spindle 90. A substantially circular guide wall 96 is positioned radially outwardly of the arcuate sector 92. A semicircular rim 98 is positioned radially outwardly of the socket spindle 90 and a lug 100 projects into the chamber 40 extending beyond the rim 98.

The lever assembly 24 includes a shiftable lever 102 and hub 104, a pivotable member 106, and a lever torsion spring 108. The hub 104 includes a centrally positioned extension 109 which mounts over the lever spindle 88 and is provided with a slit 110.

Figure 1:
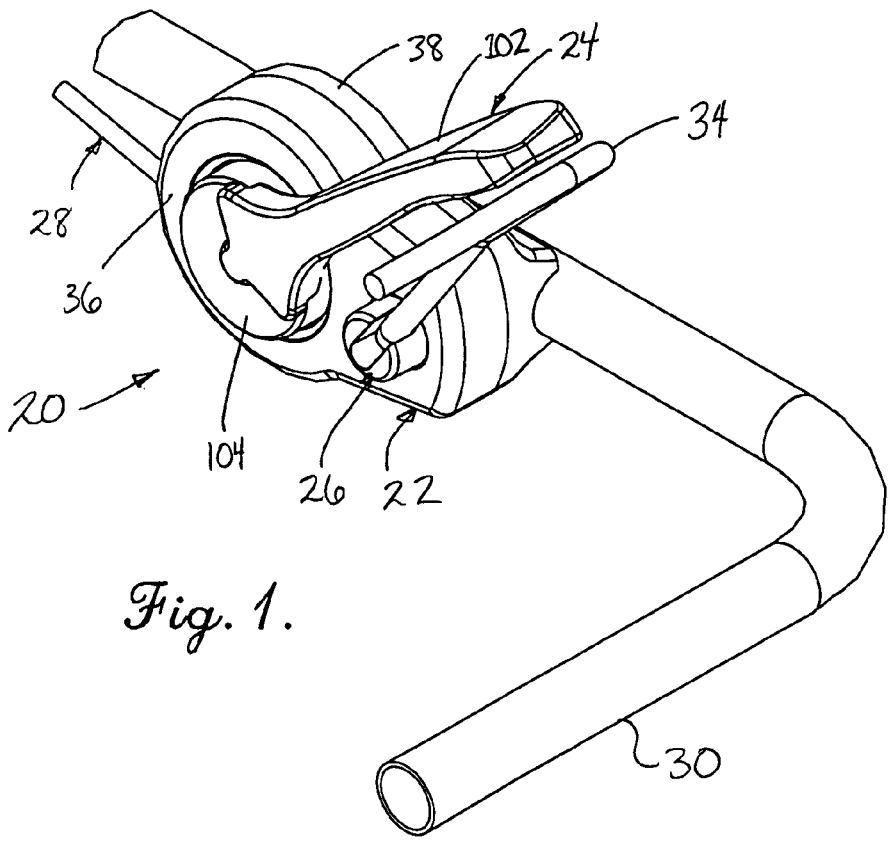
FIG. 1 is a left rear perspective view of the apparatus for two-motion cable engagement shown mounted to a handlebar of a walk-behind lawnmower, with portions of the handlebar, a control cable assembly, and a deadman handle broken away for clarity, and with the deadman handle connected to a socket of the apparatus and positioned in a disengaged position and a shiftable control lever shown in a retracted position.
Figure 2:
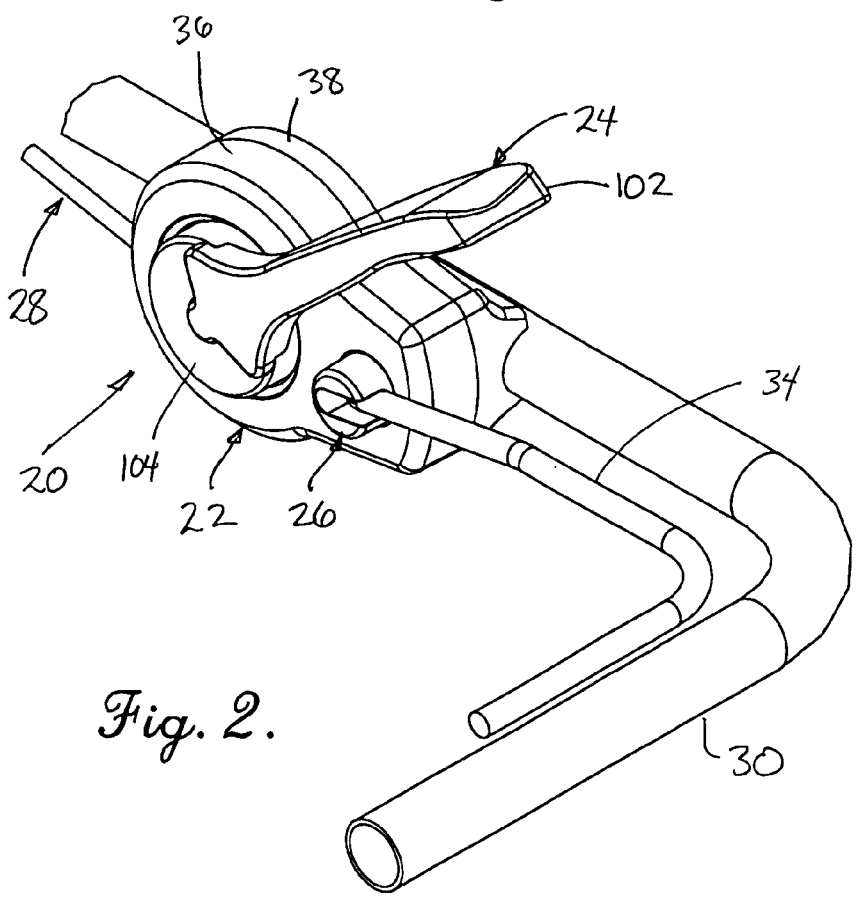
FIG. 2 is a left rear perspective view similar to FIG. 1 showing the deadman handle and the socket to which it is connected pivoted to an engaged position.
Figure 3:
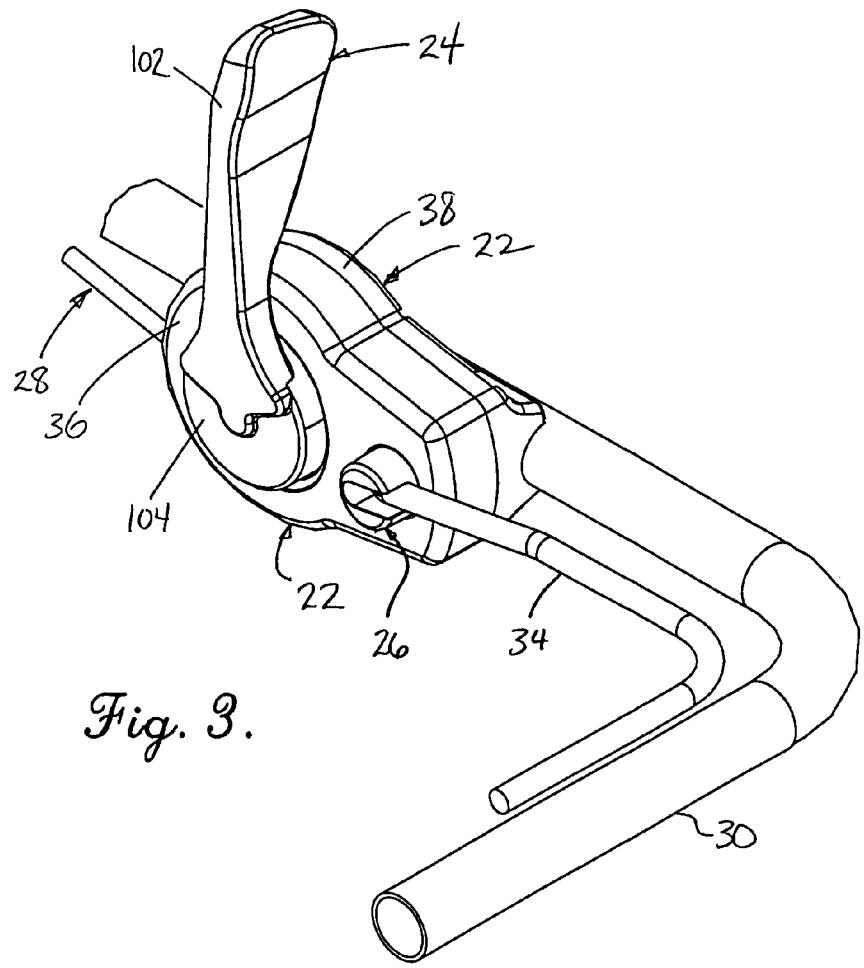
FIG. 3 is a left rear perspective view similar to FIG. 2 showing the shiftable control lever pivoted to the advanced position.
Figure 6:
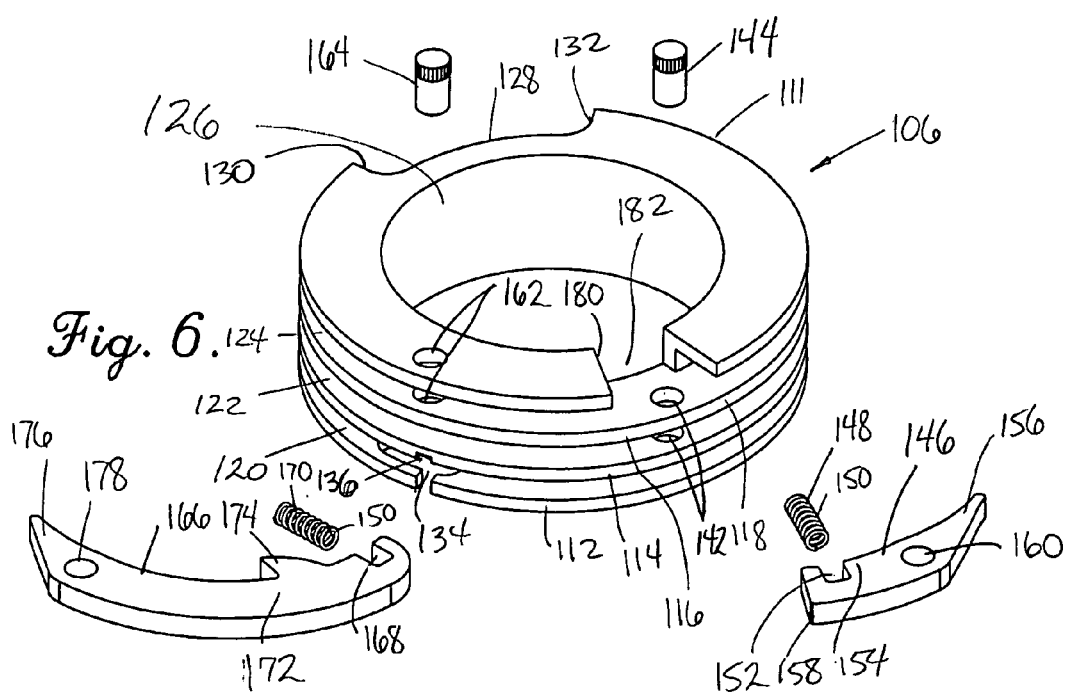
FIG. 6 is an enlarged perspective view showing the pivotable member, a catch, a pawl, pivot pins for the catch and pawl and springs for biasing the catch and the pawl outwardly from the hub member.

The pivotable member 106 is best seen in FIG. 6 and includes a spool-shaped body 111 which includes four circumferentially extending annular ribs 112, 114, 116 and 118 lying in substantially parallel planes and presenting grooves 120, 122 and 124 therebetween. The pivotable member 106 is positioned for pivoting about a common axis with the hub 14, which is defined by the axis of the lever spindle 88 and, in the preferred embodiment hereof, along which the fastener 82 extends. The ribs 112, 114, 116 and 118 are interconnected by a central cylindrical wall 126 which is substantially perpendicular to the ribs. The central cylindrical wall 126 is complementally configured with the circular guide wall 96 so that the pivotal member 106 rides on, is guided and maintained in the desired position, and pivots around the guide wall 96. The ribs each include a relieved region 128 which defines the limit of pivoting travel of the pivotable member 106, with a rear relief 130 defining the limit of rearward travel of the pivotable member 106, while a forward relief 132 defines the limit of advance of the pivotable member 106 as seen by comparing FIGS. 7 and 8 with FIGS. 9 and 10. The rear relief 130 and the forward relief 132 aid in preventing overstressing of a control cable 140. Rib 112 includes an access opening 134 and rib 114 includes a slot 136 for receipt of a terminal 138 of the control cable 140 of the control cable assembly 28, such that the control cable 140 is positioned for receipt in groove 120 between ribs 112 and 114. Ribs 114 and 116 include holes 142 for receiving a catch pivot pin 144 in press-fit relationship whereby a catch 146 is pivotably received in groove 122. A catch biasing spring 148 may be a small leaf or cantilever spring, or more preferably a small coil spring 150 as shown in FIG. 6 for receipt in a notch 152 of the catch 146. The catch biasing spring 148 is held between the ribs 114 and 116 and pushes radially outwardly from the cylindrical wall 126. The catch 146 includes a first part 154 including the notch and which is biased radially outwardly by the catch biasing spring 148, and a second part 156 located pivotally opposite the first part and which, because of the pivoting of the catch 146 about the pivot pin 144, is biased inwardly against the cylindrical wall 126. The catch 146 includes a corner 158 on the first part 154 for engagement with the socket assembly 26 as will be described. The second part 156 limits the amount of pivotal movement of the first part 154 by engagement with the cylindrical wall 126. The catch pivot pin 144 extends through a pivot opening 160 for pivotally mounting the catch 146. Ribs 116 and 118 include each include a hole 162 circumferentially spaced from holes 142 for receiving a pawl pivot pin 164 in press-fit relationship whereby a pawl 166 is pivotably received in groove 124. The pawl 166 includes a notch 168 which receives a pawl biasing spring 170 which is shown as a small coil spring 150 but could also be a leaf or cantilever spring. A first part 172 of the pawl is positioned adjacent the notch 168 and includes a latching dog hook 174. A second part 176 of the pawl 166 is positioned on the other side of a pivot opening 178 into which the pawl pivot pin 164 is received. An open sector 180 is provided in the rib 118 and a gap 182 lies in the cylindrical wall 126 adjacent to the open section 180 extending circumferentially a portion of the groove 124 as seen in FIG. 6. The open sector 180 allows for press-fit insertion of the pawl pivot pin 176 and the gap 182 permits the latching dog hook 174 to move inwardly beyond the cylindrical wall 126.

The hub 104 and lever 102 are preferably in substantial part molded as a unitary member. The lever 102 is of a sufficient length to provide a mechanical advantage relative to the diameter of the spool-shaped pivotable member so as to reduce the amount of force required by the operator to overcome the tensioning force applied by the mechanism 32 to the control cable 140. As seen in FIGS. 4 and 9, for example, the hub 104 also includes a radially projecting and axially extending shoulder 184 which includes a recess 186 complementally configured with a latching dog 188 for holding the latter in place. The latching dog 188 includes feet 190 and 192 which anchor the lug within the hub 104, and a radially projecting finger 194 adapted to engage with latching dog hook 174 of pawl 166 when the first part 172 of the pawl 166 is pressed radially inwardly toward the hub 104. The axially extending slit 110 of hub 104 receives one prong 198 of lever torsion spring 108. Another prong 200 of lever torsion spring 108 is held by slot 94 in arcuate sector 92. The torsion spring 108 is configured to fit over the arcuate sector 92 and serves to bias the lever and hub 104 rearwardly or clockwise when viewed in FIGS. 7-10.

Figure 9:
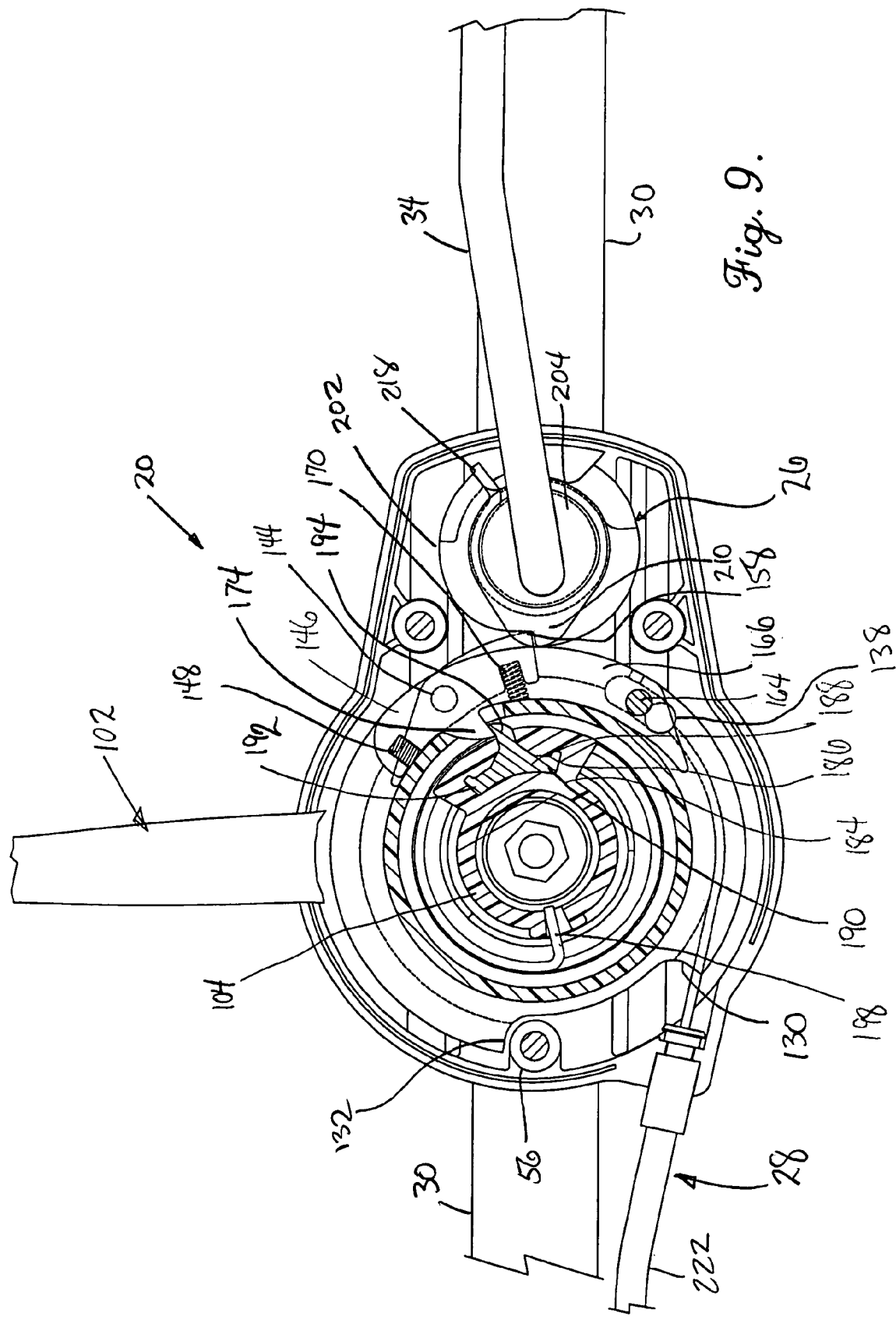
FIG. 9 is an enlarged, vertical cross-sectional view similar to FIG. 8, showing the movement of the pivotable member and pawl resulting from advancement of the shiftable lever to the advanced position.
Figure 10:
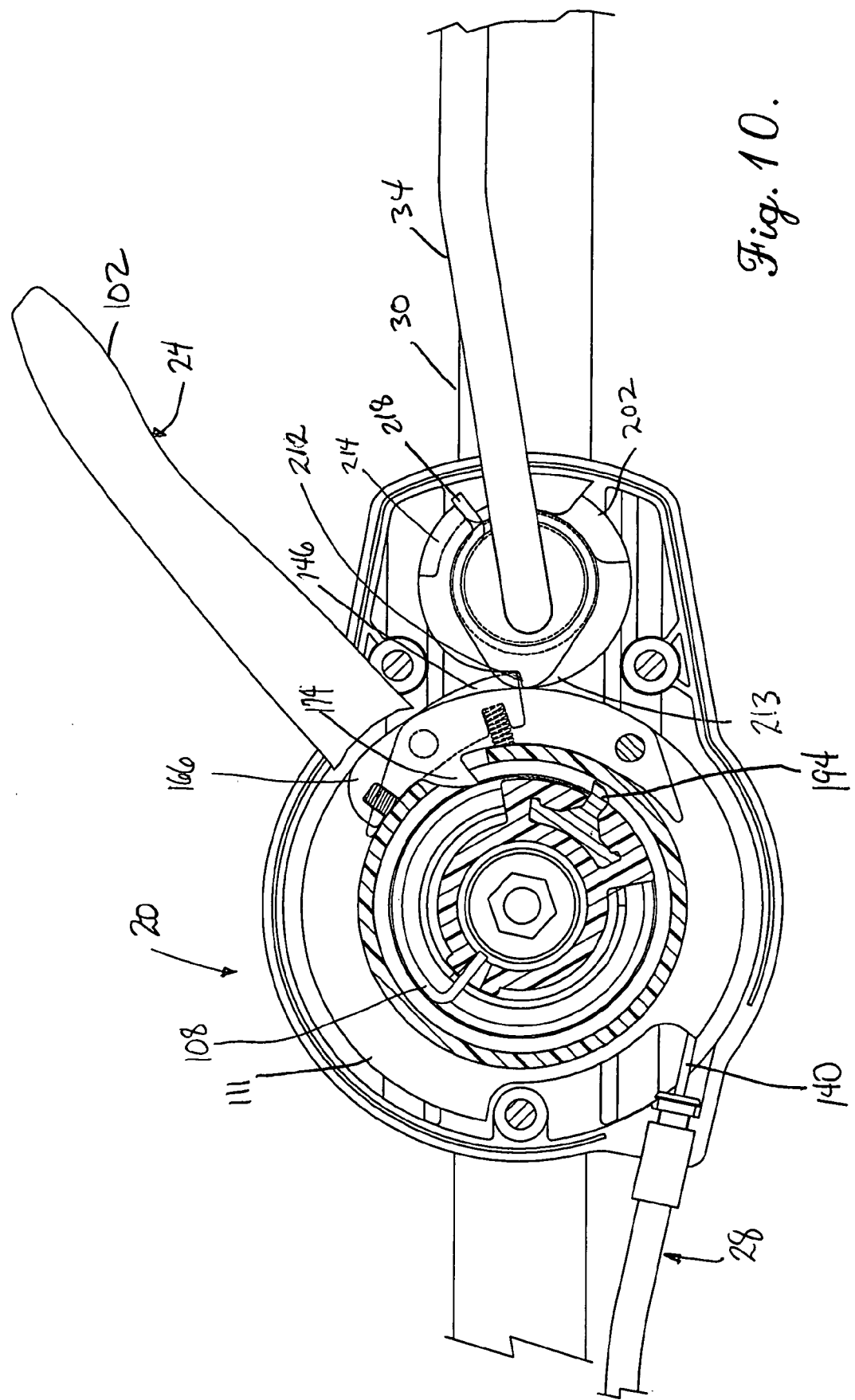
FIG. 10 is an enlarged, vertical cross-sectional view similar to FIG. 9, showing the positions of the pivotable member, pawl and catch when the deadman handle remains engaged but the shiftable lever is permitted to return to the initial position.

The socket assembly 26 includes a socket 202 having a receiver 204 which projects out of the small circular opening of the first housing half, the receiver 204 including a channel 206 for mounting and receiving one end of the deadman handle 34 therein such that pivoting movement of the deadman handle 34 causes consequent pivoting of the socket 202. As seen in FIG. 4, the socket 202 includes a tubular collar 206 which rides on the socket spindle 90 to permit pivotal movement of the socket 202 about the socket spindle 90. The socket further includes a cam member 208 positioned whereby the catch 146 may ride on the cam member 208. The cam member 208 includes an eccentric 210 as best seen in FIGS. 7-10 which has a leading side which is sloped and an adjacent step 212 on the trailing side of the eccentric, the step 212 being configured to hold fast the corner 158 of the catch 146 when the deadman handle 34 is grasped and pivoted to the engaged position and the lever has been advanced as shown in FIGS. 9-10. Both the eccentric 210 and the step 212 have an axial depth substantially similar to the width of the catch. The cam member 208 also includes a lobe 213 axially offset from the eccentric 210 for engagement with the pawl 166 in order to depress the first part 172 of the pawl 166 when the socket 202 is pivoted by the deadman handle 34. A lug 214 projects axially from the cam member 208 toward the second housing half 38, and is best seen in FIG. 4. Preferably, the lug 214 is circumferentially spaced from the step 212. The socket assembly further includes a socket torsion spring 216 which fits over the collar 206 and includes first and second prongs 218 and 220. In the illustrated embodiment, prong 218 engages lug 214 while prong 220 engages lug 100 of the second housing half, such that pivotal movement of the socket causes the prongs 218 and 220 to converge and thereby bias the socket 202 in a counterclockwise direction as seen in FIGS. 7-10. It may be appreciated that the direction of the pivoting action of the pawal and the catch, their orientation relative to the spool-shaped pivotable member, and their configurations are all different because of the different functions they perform in the operation of the apparatus hereof.

The control cable assembly 28 includes a sheath 222 which surrounds the control cable 140 which is shiftable within the sheath 222. The sheath 222 may be fixed at its remote end by a clamp 224 or other retaining member as shown in FIG. 7, and the remote end 226 of the control cable 140 is operatively connected to the remotely controlled mechanism 32. The proximate end of the sheath 222 is provided with a fitting 228 which fits within a seat 230 of one of the housing halves as best seen in FIG. 5. The proximate end of the control cable 140 is provided with the terminal 138 which fits into the access opening 134 and slot 136 and such that the control cable 140 is positioned for receipt in groove 120. Thus, the control cable 140 is operatively connected to the lever 102 via the hub 104 and the pivotable member 106, and also, as will be described more fully in regard to the operation of the apparatus 20, to the deadman handle 34 via the socket assembly 26.

As noted above, the apparatus 20 hereof is normally provided in assembled condition to a manufacturer of power equipment, such as a walk-behind lawnmower, whereby the only actions required by the manufacturer of the power equipment are attachment of the remote end 226 of the control cable 140 to the mechanism 32, attachment of the clamp 224 to the lawnmower at a desired location, and coupling of the housing 22 to the handlebar using fastener 82 and nut 84.

In use, the apparatus 10 is biased to the initial position shown in FIG. 7. In this position, the deadman handle 34 is positioned to extend out of the plane of the handlebar 30 so that the user must actively grasp the deadman and pivot it toward the handlebar to actuate the mechanism 32. In this initial position, the socket torsion spring 216 biases the socket 202 in a counterclockwise direction as seen in FIGS. 7-10, its pivotal movement in the counterclockwise direction being limited by an engagement between an ear 232 of the socket 202 and the lug 100 of the second housing half 38. The lever torsion spring 108 biases the lever in a clockwise direction as viewed in FIGS. 7-10, with the prongs fitting into the slot 196 and slot 94, the rearward (or clockwise) travel of the lever being limited by the engagement with one of the threaded fasteners and also by engagement of the forward relief 132 with receiver 56. FIG. 7 shows this initial or primary position of the socket 202, and in this primary position, the catch biasing spring 148 and the pawl biasing spring 170 both initially position the first parts of the catch and the pawl radially outwardly so that advancing movement of the lever 102 and the hub 104 both operatively and physically connected thereto produces no corresponding pivoting movement of the pivotal member 106 which includes the catch 146, the pawl 166, and their respective biasing springs and pivot pins. It may be appreciated from the drawings that the first part of the pawl 166 is oriented on the counterclockwise side of its pivot opening 178, while the first part of the catch 146 is positioned on the clockwise side of its pivot opening 160 as viewed in FIGS. 7-10. Thus, the pawl 166 and catch 146 have different pivoting directions, with the second part of each the pawl and catch limiting the extent to which the pawl and catch are permitted to pivot radially outwardly from the ribs.

Figure 8:
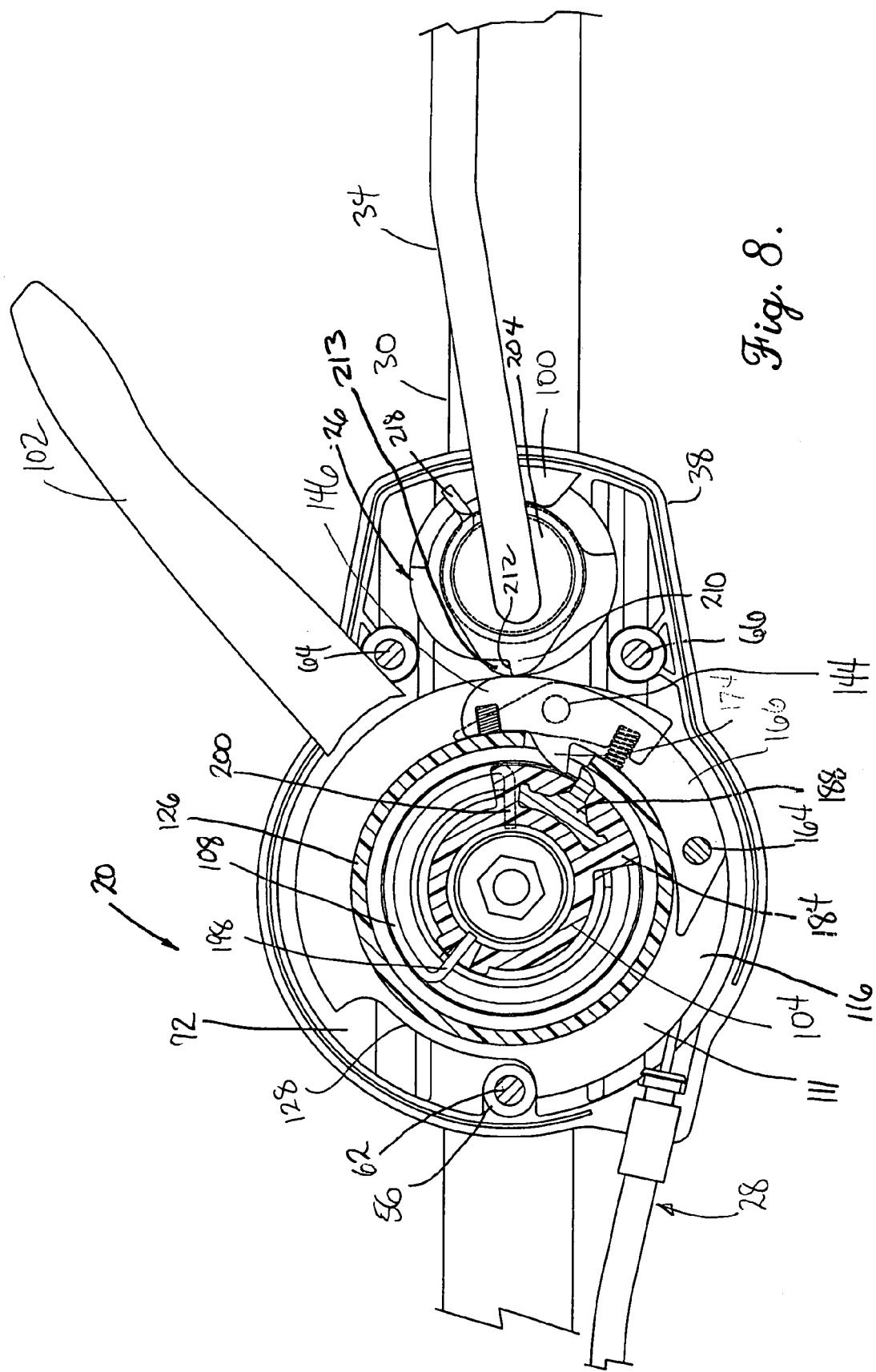
FIG. 8 is an enlarged vertical cross-sectional view similar to FIG. 7, showing the movement of the socket and corresponding movement of the catch as a result of shifting of the deadman handle to the engaged position while the shiftable lever remains in the initial position.

When the deadman handle 34 is grasped and pivoted clockwise to the position shown in FIG. 8, the socket torsion spring is compressed, and the lobe 213 moves to a position adjacent the first part 172 of the pawl and moves the first part of the pawl 166 radially inwardly, the second part 176 of the pawl then moving radially outwardly slightly. This movement causes the latching dog hook 174 to move radially inwardly through the gap 182 and in condition for interference with the radially extending finger 194 of latching dog 188. In this position shown in FIG. 8, the first motion of the two-motion engagement is accomplished, but the mechanism 32 is still not actuated. Rather, the mechanism is now ready for actuation.

The operator next moves the lever 102 forwardly or counterclockwise as viewed in FIG. 8, maintaining the required grasp to maintain the position of the deadman handle 34 as illustrated previously in FIG. 8. Movement of the lever 102 requires the operator to overcome the biasing force of the lever torsion spring 108. In so doing, the hub 104 and the latching dog 188 also move in a counterclockwise direction. As the latching dog 188 moves counterclockwise, its finger 194 engages the latching dog hook 174 of the pawl 166, and the spool-shaped pivotable member 106 then begins to move counterclockwise as well. The pivotable member 106, being connected to the terminal of the control cable, pulls the control cable 140 into the housing 22. Once the lever 102 moves the hub 104 and pivotable member 106 a sufficient distance in a rotational sense, the first part of the catch 146 clears first engages and then clears the eccentric 210 and the corner 158 then audibly clicks into the step 212 and is held by the step 212 of the catch 146. The catch 146, which is coupled to the pivotable member 106, thus acts with the socket 202 to hold the spool-shaped pivotable member 106 against return clockwise motion, leaving the control cable 140 and the mechanism 32 in an actuated condition.

As a result, the operator may now allow the lever to comfortably return to its initial position as shown in FIG. 10, with the control cable 140 still in the engaged position. This avoids any unintended snap-back of the lever 102 at a later time when the deadman lever 34 is released. The operator is now free to keep both hands on the handlebar 30 for operation of the equipment. Because the latching dog is positioned on the lower or clockwise side of the latching dog hook, the lever 102 and the hub 104 move in a clockwise direction when the operator releases the lever or eases it rearwardly, while the pivotable member 106 is maintained in the actuated position by the catch 146.

However, in the event that the operator releases the deadman for any reason, or should the control cable break, or should the deadman lever break, or should the socket break, the apparatus hereof fails to a safe condition. Release of the deadman handle or should it break causes the eccentric to move in a counterclockwise direction, moving the step 212 away from the catch 146. Once the catch 146 is no longer held by the step 212, the torsion spring 108 immediately returns the pivotable member back to the initial position as shown in FIG. 7. This disengagement is automatic because the mechanism 32 includes a spring 234 or other member which causes a tensioning force to be exerted on the control cable 140, causing the mechanism to become disengaged in the event that it is not held in the engaged position by the apparatus 20 hereof.

Moreover, the pawl 166 is biased away from the cylindrical wall and also the latching dog, such that if the deadman handle 34 is not sufficiently pivoted to cause the lobe 213 to move the first part of the pawl 166 inwardly, the control cable 140 may not be advanced. This is because the eccentric must be pivoted into a position, which in the preferred embodiment is substantially aligned along an axis between the pivot axis of the hub 104 and the pivot axis of the socket 202 as shown in FIG. 8, such that the pawl 166 must be moved radially inwardly such that its latching dog hook 174 is in position to engage the finger of the latching dog in order for the pivotal member 106 to shift along with the hub 104. When the deadman handle is not sufficiently pivoted, then the eccentric on the socket 202 does not depress the first part of the pawl 166, and thus the finger of the latching dog 188 moves past the latching dog hook 174 without engaging it, and the pivotal member 106 and thus the control cable 140 to which it is attached, does not shift with the lever and the hub.

Advantageously, the engagement and disengagement of the catch 146 and the step 212 produces an audible "click" sound, so that the operator has both a tactile and audible feel for when the catch engages and disengages. The mechanical advantage provided by the moment arm of the deadman handle relative to the eccentric on the socket 202 also makes operation of the apparatus 20 hereof more comfortable for the operator, as relatively little force is required to be applied to the deadman handle to maintain the corner 158 of the catch 146 in the step 212 and thus retain the control cable 140 and the mechanism 32 to which it is attached in an engaged, operating condition.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the literal scope of the invention as set out in the following claims.

The invention claimed is:

1. An apparatus for two-motion cable operation adapted for operating a mechanism via a control cable extending between the apparatus and the mechanism, said apparatus comprising:
   a housing defining a chamber therein;
   a lever assembly pivotably mounted to the housing, the lever assembly including a lever extending from the housing and a hub substantially received in the chamber, the lever and hub being coupled for companion shiftable movement between an initial position and an advanced position, said lever assembly further including a pivotal member operatively coupled to the hub and shiftable relative to the hub, said pivotable member being adapted for coupling to the control cable; and
   a socket assembly mounted to the housing and adapted for mounting a deadman handle thereto, said socket assembly including a socket which is pivotably mounted to the housing for movement between a primary position and an engaged position, said socket having a cam member positioned in said chamber, said cam member including an eccentric,
   wherein said pivotal member further includes a body, a catch pivotally mounted to the body for selective engagement with the socket, and a pawl pivotaily mounted to the body for selective engagement with the hub,
   wherein the cam member is positioned sufficiently proximate to the pivotal member such that pivoting of the socket from a primary position shifts the cam member into an engaged position opposite and in engagement with the catch of the pivotal member whereby subsequent shifting of the lever towards the advanced position produces engagement between the hub and the pawl of the pivotal member and consequent pivotal movement of the pivotable member corresponding to movement of the lever from the initial position to the advanced position.

2. An apparatus as set forth in claim 1, the cam member further including a step positioned adjacent the eccentric and positioned for engagement with the pivotable member such that when the lever and hub are shifted to the advanced position after pivoting of the socket to the engaged position to place the eccentric in engagement with the pivotal member and maintaining the socket in the engaged position, the pivotal member is retained in a forwardly pivoted position by the step when the lever is shifted back to the initial position.

3. An apparatus as set forth in claim 2, wherein the catch is mounted for pivotal movement relative to the body between a first position and a second radially extended position, such that when the catch is in the second radially extended position and when the lever and hub are advanced after pivoting of the socket into the engaged position, a portion of the catch is held by the step for retaining the pivotal member in the forwardly pivoted position when the lever is shifted beck to the initial position.

4. An apparatus as set forth in claim 1, wherein the socket assembly includes a spring operatively connecting the housing and the socket for biasing the socket to the primary position.

5. An apparatus as set forth in claim 4, wherein the spring is a torsion spring.

6. An apparatus as set forth in claim 1, wherein the lever assembly includes a spring operatively connecting the lever and hub to the housing for biasing the lever and hub to the initial position.

7. An apparatus as set forth in claim 1, wherein the pawl is mounted for pivotal movement relative to the body between a first position and a second position, such that in the first position, the pawl is positioned in radially spaced relationship to the hub, and in the second position the pawl is positioned to engage a part of the hub during shifting of the hub from the initial to the advanced position.

8. An apparatus as set forth in claim 7, wherein the pivotal member includes a spring positioned between the body and the pawl for biasing a first part of the pawl radially outwardly from the body.

9. An apparatus as set forth in claim 7, wherein the hub includes a latching dog having a radially extending finger, said finger extending from the hub for engagement with the pawl when the pawl is in the second position during shifting of the lever and hub from the initial to the advanced position.

10. An apparatus as set forth in claim 1, wherein said socket and lever assembly are operatively connected such that retention of the socket in an engaged position retains the pivotal member in an actuating condition when the lever is returned to the initial position.

11. In a lawnmower apparatus having an engine, a mower deck, a handlebar connected to the deck for permitting walk-behind operation of the lawnmower, a deadman handle pivotally connected to the handlebar, and a control cable for operating a blade mounted below the mower deck and operatively connected to the engine, an apparatus for two-motion operative cable engagement for enabling operation of the blade by the engine, said apparatus comprising:
   a housing defining a chamber within the housing;
   a lever assembly including a lever positioned substantially outside the housing and a hub connected to said lever and positioned substantially within said housing, said hub and said lever being mounted to said housing for pivotally movement relative thereto between an initial position and an advanced position, said lever assembly further including a spring operatively connecting the housing and the lever assembly for biasing the lever to the initial position;
   a control cable assembly including the control cable and a sheath, said sheath including structure mounted to said housing;
   said lever assembly further including a pivotal member operatively connected to said lever and said hub, said pivotal member being mounted for pivoting relative to said housing within said chamber, said pivotal member being pivotal about a common axis shared with said hub and circumferentially shiftable relative thereto;
   a socket assembly including a socket having a cam which includes an eccentric, said socket being adapted to receive the deadman handle, said socket being pivotally mounted relative to said housing and operatively coupled to said pivotal member, wherein said pivotal member further includes a body, a catch pivotally mounted to the body for selective engagement with the socket, and a pawl pivotally mounted to the body for selective engagement with the hub, such that pivoting of the socket from a primary position to an engaged position and also engagement between the cam of the socket and the catch of said pivotal member thereby permits pivoting of said pivotal member along with said hub and consequent shift of said control cable relative to said sheath during shifting of the lever from an initial position to the advanced position and engagement between the pawl of the pivotal member and the hub.

12. An apparatus as set forth in claim 11, wherein the pivotal member includes a spool-shaped body having a plurality of circumferentially extending ribs and at least one groove, said catch being pivotally mounted to said body and received in said one groove and positioned for selective operative engagement with said socket.

13. An apparatus as set forth in claim 12, wherein the body presents a multiplicity of circumferentially extending ribs and a second groove, and wherein said pawl is pivotally mounted in said second groove, said pawl being mounted for selective operative engagement with said socket and for operative engagement with said socket.

14. An apparatus as set forth in claim 13, wherein operative engagement between said pawl and said socket enables engagement between said pawl and said hub to permit said pivoting of said pivotal member along with said hub during said shifting of the lever from the initial position to the advanced position.

15. An apparatus as set forth in claim 14, wherein said socket includes a seat cooperatively configured with said catch for retaining said catch and said body against substantial pivotal movement while said socket remains in the engaged position.

16. An apparatus as set forth in claim 15, wherein a humanly audible sound is produced upon engagement and disengagement between said catch and said socket.

17. An apparatus as set forth in claim 11, wherein said socket and lever assembly are operatively connected such that retention of the socket in an engaged position retains the pivotal member in an actuating condition and the control cable in a shifted position relative to said sheath when the lever is returned to the initial position.

18. An apparatus for two-motion cable operation adapted for operating a mechanism via a control cable extending between the apparatus and the mechanism, the apparatus comprising:
  a housing defining a chamber therein;
  a lever assembly pivotably mounted to the housing, the lever assembly including a lever extending from the housing and a hub substantially received in the chamber, the lever and hub being coupled for companion shiftable movement between an initial position and an advanced position, said lever assembly further including a pivotal member operatively coupled to the hub and shiftable relative to the hub;
  a control cable operatively connected to the pivotal member and shiftable corresponding to movement of the pivotal member between non-actuated condition and an actuated condition;
  a socket assembly mounted to the housing and adapted for mounting a deadman handle thereto, said socket assembly including a socket which is pivotably mounted to the housing for movement between a primary position and an engaged position,
  an engagement assembly operatively connecting the pivotal member to the socket and operative, after pivoting of the socket from a primary position to an engaged position, to retain the pivotal member in an actuation position upon shifting of the lever from an initial position to an advanced position pivots the pivotal member following return of the lever to the initial position with the pivotal member retaining the control cable in an actuating position,
  wherein said lever assembly and said socket assembly are mounted to the housing in respective positions enabling movement of the lever from said initial position to said advanced position when the engagement assembly is not operatively connecting the lever assembly and the socket assembly.

19. An apparatus as set forth in claim 18, wherein the engagement assembly is adapted to connect the pivotal member to the socket assembly such that shifting of the socket assembly causes no consequent movement of the lever of the lever assembly.

* * * * *